United States Patent [19]
Saito

[11] Patent Number: 5,692,036
[45] Date of Patent: Nov. 25, 1997

[54] FACSIMILE APPARATUS HAVING AUTO CALLING FUNCTION

[75] Inventor: Toshiaki Saito, Yokohama, Japan

[73] Assignee: Canon Kabushiki Kaisha, Tokyo, Japan

[21] Appl. No.: 440,491

[22] Filed: May 12, 1995

[30] Foreign Application Priority Data

May 13, 1994 [JP] Japan ................... 6-124283

[51] Int. Cl.$^6$ .............................. H04M 11/00; H04N 1/00
[52] U.S. Cl. .................... 379/100; 379/93; 379/216; 358/434; 358/438
[58] Field of Search .................. 379/93, 96, 97, 379/98, 100, 216; 358/434, 438, 440, 404

[56] References Cited

U.S. PATENT DOCUMENTS 5,473,674 12/1995 Maeda ..................... 379/100
5,473,691 12/1995 Menezes et al. ................. 358/440
5,521,719 5/1996 Yamada ..................... 379/100

*Primary Examiner*—Curtis Kuntz
*Assistant Examiner*—Stephen W. Palan
*Attorney, Agent, or Firm*—Fitzpatrick, Cella, Harper & Scinto

[57] ABSTRACT

A facsimile apparatus facilitates the setting of SUB/SEP/PWD of the ITU-T Recommendation T.30.

A service access number area for storing information for generating a SUB or SEP signal and a service access password area for a PWD signal are provided in an auto-dial such as one-touch dial or abbreviated dial to eliminate need of a user to set SUB/SEP/PWD for each transmission.

12 Claims, 5 Drawing Sheets

|  | DESTINATION'S DIAL NUMBER | DESTINATION'S ABBREV. NAME | SERVICE ACCESS NUMBER | SERVICE ACCESS PASSWORD |
|---|---|---|---|---|
| ONE-TOUCH 1 | 5482-7200 | A ENTERPRISE DIVISION | 0001 | NOT YET REGISTERED |
| ONE-TOUCH 2 | 5482-1111 | B ENTERPRISE DIVISION | 0020 | 1234 |
| . . . | . . . | . . . | . . . | . . . |
| ONE-TOUCH N | 5482-0123 | N ENTERPRISE DIVISION | 0990 | 1111 |

FIG. 2

| | DESTINATION'S DIAL NUMBER | DESTINATION'S ABBREV. NAME | SERVICE ACCESS NUMBER | SERVICE ACCESS PASSWORD |
|---|---|---|---|---|
| ONE-TOUCH 1 | 5482-7200 | A ENTERPRISE DIVISION | 0001 | NOT YET REGISTERED |
| ONE-TOUCH 2 | 5482-1111 | B ENTERPRISE DIVISION | 0020 | 1234 |
| ... | ... | ... | ... | ... |
| ONE-TOUCH N | 5482-0123 | N ENTERPRISE DIVISION | 0990 | 1111 |

FACSIMILE APPARATUS HAVING AUTO CALLING FUNCTION

BACKGROUND OF THE INVENTION

1. Field of the Invention

The present invention relates to a facsimile apparatus having an auto-calling function such as a one-touch dial or an abbreviated dial.

2. Related Background Art

In a prior art G3 facsimile apparatus, a personal (or confidential) communication function or a relay communication function is attained by a non-standard function such as NSF (non-standard facilities), NSS (non-standard setup) or NSC (non-standard command). Thus, it is attained only among facsimile apparatuses of the same manufacturer.

On the other hand, in the ITU-T Recommendation T.30, it is possible to attain the personal communication function and the relay communication function by using a new signal message frame by SUB (sub-address)/SEP (selective polling)/PWD (password).

However, it is troublesome for a user to designate information to be set in such a new signal message frame for each transmission.

Further, in transmission and polling reception, signal messages which can be sent to a destination station are predetermined, and the designation of the type of message by the user leads to confusion of the user, and if it is permitted to register all signal frames, a memory usage efficiency is lowered.

Methods and objects to use the new signal message frames are different from facsimile apparatus to facsimile apparatus. In such a case that a user designates the communication by using the new signal message frame, if an apparatus at a destination station does not have a function to receive the new signal message frame, there will be confusion on the user side unless the user can select whether to interrupt the communication or to continue normal communication without sending the new signal message frame.

SUMMARY OF THE INVENTION

In light of the above, it is an object of the present invention to provide an improved facsimile apparatus.

It is another object of the present invention to provide a facsimile apparatus which can set SUB/SEP/PWD while efficiently using a memory without causing troublesome operation or-confusion.

It is a still another object of the present invention to provide a facsimile apparatus which has a memory area for registering information to generate a sub-address signal (SUB), a selective polling signal (SEP) or a password signal (PWD) for calling information of a calling station used for an auto-calling function, and generates and sends a communication protocol signal in accordance with the registered information at the auto-calling to eliminate the need of the operator to set the SUB, SEP or PWD for each transmission.

Other objects of the present invention will be apparent from the following description of the embodiments and the drawings.

BRIEF DESCRIPTION OF THE DRAWINGS

FIG. 2 illustrates an information table of a one-touch dial used in the above embodiment.

DETAILED DESCRIPTION OF THE PREFERRED EMBODIMENT

One embodiment of the present invention is now explained in detail in conjunction with the drawings.

Figure 1:
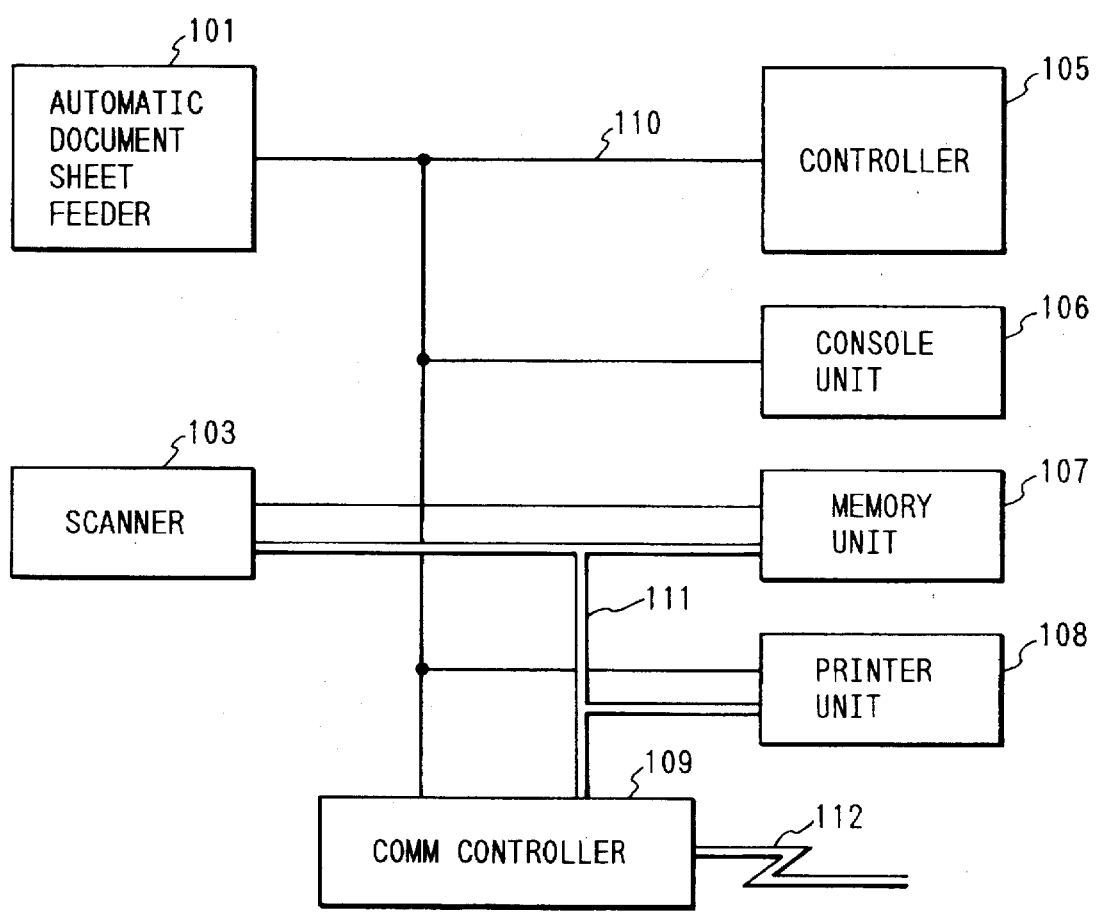
FIG. 1 shows a block diagram of one embodiment of the present invention.

FIG. 1 shows a block diagram of a configuration of a facsimile apparatus in accordance with one embodiment of the present invention.

An automatic document feeder (ADF) unit 101 automatically feeds a stacked document sheet to a document sheet read station by a command from a control unit and feeds the document sheet to a scanner unit 103 when the document sheet is to be read. The scanner unit 103 comprises a CCD which reads the document sheet as image data.

A control unit 105 controls an overall apparatus and comprises a CPU, a ROM and a RAM. A console unit 106 comprises a ten-key unit for dial input and LCDs for displaying states.

An image data memory unit 107 temporarily stores image data read by the scanner 103 or received image data. A printer unit 108 records the image data.

A communication control unit 109 controls calling/receiving for a communication line 112 such as PSTN or ISDN and controls G4/G3 communication.

A control bus 110 controls operations of blocks by the control unit 105 and a video bus 111 handles the image data.

FIG. 2 shows an information table of auto-dial (one-touch dial) information used in the auto-calling in the present embodiment.

As shown, a service access number area for storing a SUB signal or a SEP signal and a service access password area for storing a PWD signal are provided in addition to a dialing number and an abbreviation of a destination station, for each one-touch dial button.

Figure 3A:
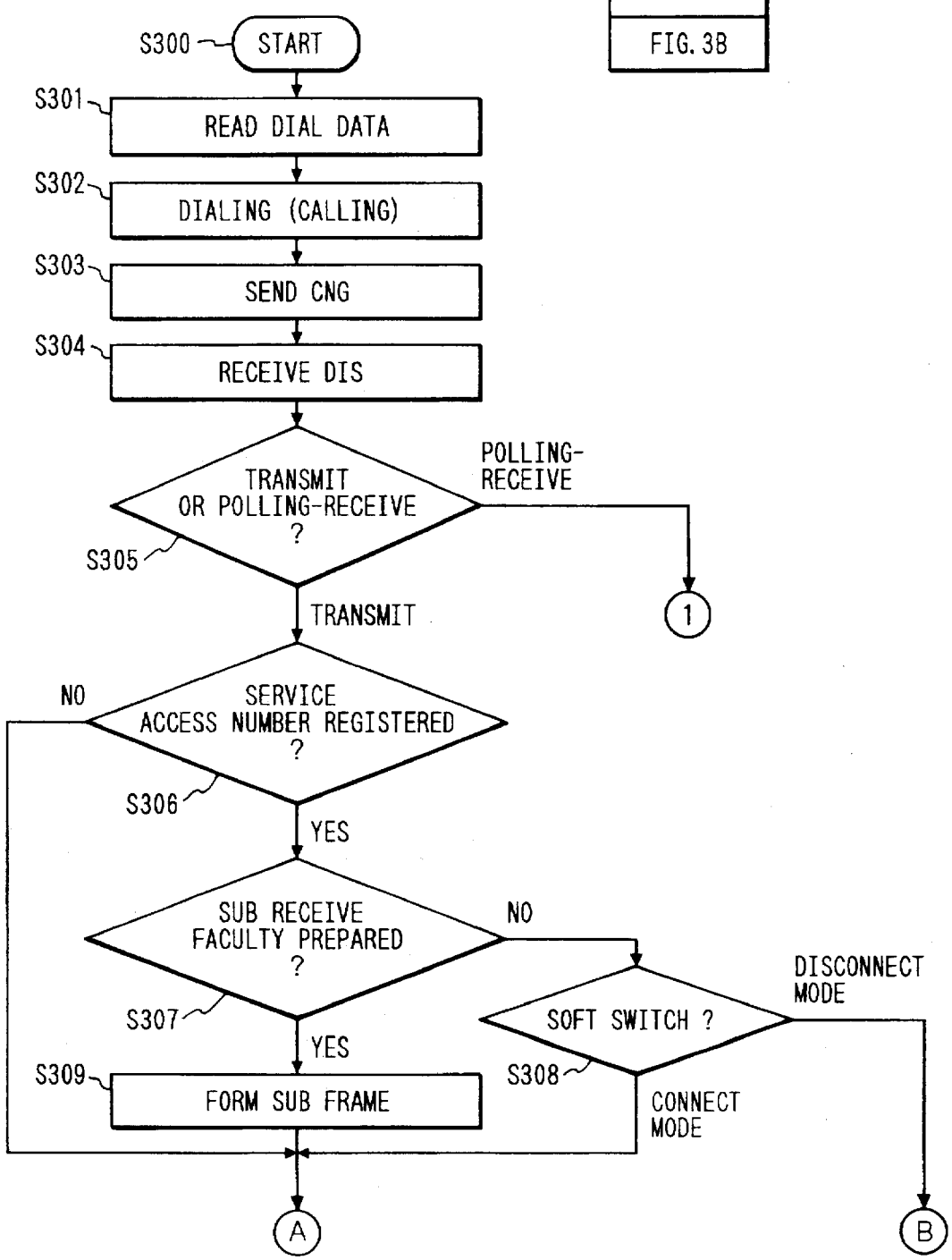
FIG. 3 is composed of FIGS. 3A and 3B showing a flow chart of an operation of calling by using an auto-dial of a control unit of the above embodiment.
Figure 3:
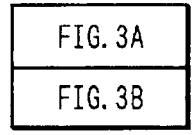
Figure 3B:
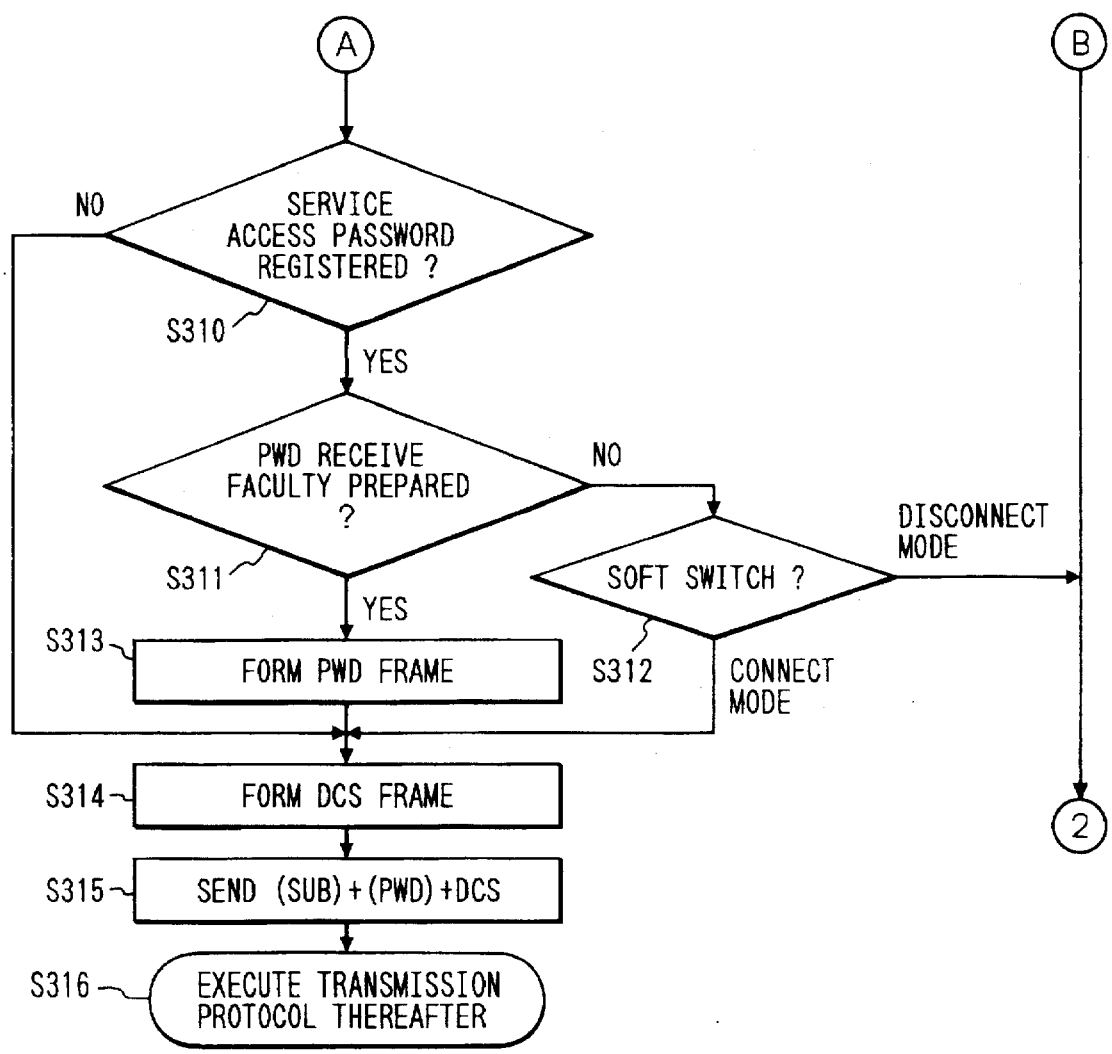
Figure 4:
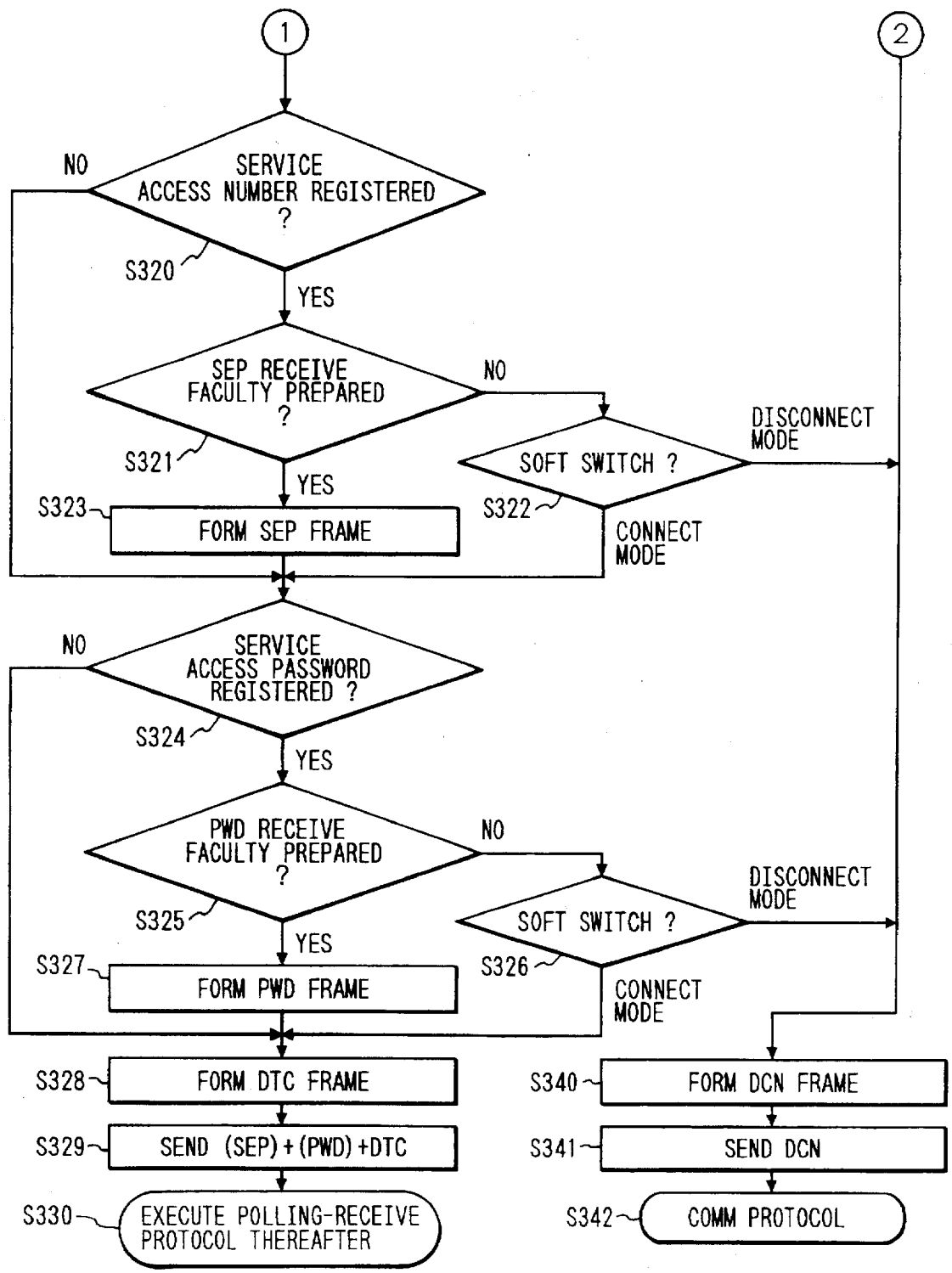
FIG. 4 shows a flow chart of an operation of calling by using the auto-dial of the control unit of the above embodiment.

FIGS. 3A and 3B, and FIG. 4 show flow charts of operations of the calling by using the auto-dialing of the control unit 105 in the present embodiment.

In S301, the information corresponding to the auto-dial number designated by the manipulation of the user is looked up from the auto-dial information table. For example, when a call is requested by using the auto-dial of one-touch 2, the destination dial of '5482-1111' is looked up and the destination abbreviation of 'B division', the service access number of '0020' and the service access password of '1234' are looked up.

In S302, a call is made to the looked-up destination dial through the communication control unit 109. When connection is made to the destination station, a CNG signal is sent from the communication control unit 109 in S303 to start the G3 communication, and in S304, a DIS signal is received from the destination station.

When the DIS signal is received, whether the communication operation by the user is for the transmission or for the polling reception is determined in S305. For example, the transmission or the polling reception is determined by whether a document sheet is present in the ADF 101 or not.

If the document sheet is present in the ADF 101 and the transmission is detected, the process proceeds to S306, and if the document sheet is not present and the polling reception is detected, the process proceeds to S320.

In S306, whether the service access number looked up in S301 has been registered or not is determined. If it has been registered, the process proceeds to S307, and if it has not been registered, the process skips to S310.

In S307, whether a function to receive the SUB signal frame indicated by the DIS signal received in S304 is present or not is determined. If it is present, the process proceeds to S309, and if it is not present, the process proceeds to S308.

In S308, a state of a soft switch 'SUB/SEP/PWD transmission disable operation mode' previously registered by the user is determined. If it is in a disconnection mode, the process proceeds to S340, and if it is in a connection mode, the process skips to S310.

In S309, since the destination station has the function to receive the SUB signal frame, the SUB signal frame is prepared from the information of the looked-up service access number area.

In S310, whether the service access password looked up in S301 has been registered or not is determined. If it has been registered, the process proceeds to S311, and if it has not been registered, the process skips to S314.

In S311, whether a function to receive the PWD signal frame indicated by the DIS signal received in S304 is present or not is determined. If it is present, the process proceeds to S313, and if it is not present, the process proceeds to S312.

In S312, the state of the soft switch 'SUB/SEP/PWD transmission disable mode' previously registered by the user is determined as it is in S308. If it is in the disconnection mode, the process proceeds to S340, and if it is in the connection mode, the process skips to S314.

In S313, since the destination station has the function to receive the PWD signal frame, the PWD signal frame is prepared from the looked-up service access password information.

In S314, the DCS signal indicating the page information for transmission is prepared. In S315, a multi-frame signal {(SUB)+(PWD)+(DCS)} so far prepared is sent to the destination station. In S316, the transmission is conducted thereafter.

If the polling reception is detected in S305, whether the service access number looked-up in S301 has been registered or not is determined in S320. If it has been registered, the process proceeds to S321, and if it has not been registered, the process skips to S324.

In S321, whether a function to receive the SEP signal frame indicated by the DIS signal received in S304 is present or not is determined. If it is present, the process proceeds to S323, and if it is not present, the process proceeds to S322.

In S322, the state of the soft switch 'SUB/SEP/PWD transmission disable operation mode' previously registered by the user is determined as it is in S308. If it is in the disconnection mode, the process proceeds to S340, and if it is in the connection mode, the process skips to S324.

In S323, since the function to receive the SEP signal frame is present in the destination station, the SEP signal frame is prepared from the looked-up service access number.

In S324, whether the service access password looked-up in S301 has been registered or not is determined. If it has been registered, the process proceeds to S325 and if it has not been registered, the process skips to S328.

In S325, whether a function to receive the PWD signal frame indicated by the DIS signal looked up in S304 is present or not is determined. If it is present, the process proceeds to S327, and if it is not present, the process proceeds to S326.

In S326, the state of the soft switch 'SUB/SEP/PWD transmission disable operation mode' previously registered by the user is determined as it is in S308. If it is in the disconnection mode, the process proceeds to S340, and if it is in the connection mode, the process skips to S328.

In S327, since the function to receive the PWD signal frame is present in the destination station, the PWD signal frame is prepared from the looked-up service access password.

In S328, a DTC signal indication the ability of its own apparatus for the polling reception is prepared, in S329, the multi-frame signal {(SEP)+(PWD)+(DTC)} so far prepared is sent to the destination station, and in S330, the polling reception operation is conducted.

In S308, S312, S322 and S326, if the soft switch 'SUB/SEP/PWD transmission disable operation mode' is in the disconnection mode, the DCN signal frame is prepared in S340 to interrupt the communication, in S341, the DCN signal is sent to the destination station, and in S342, the line is released and the communication is interrupted.

In the present embodiment, the one-touch dial is used as the auto-dial function. Alternatively, an abbreviation dial may be used.

In accordance with the present embodiment, the service access number area for storing the information for generating the SUB or SEP signal and the service access password area for the PWD signal are provided for the auto-dial to eliminate the user's burden of setting SUB/SEP/PWD for each transmission.

When the call is made by the auto-dial, the SUB signal frame is prepared from the information if it is the transmission with the corresponding service access number area being registered, the SEP signal frame is prepared from the information if it is the polling reception, and the PWD signal frame is prepared if the service access password area has been registered, so that the confusion of the user due to the user's selection of the signal message to be sent in accordance with the communication operation mode is avoided and the service access number area may be shared by the SUB signal in the transmission and the SEP signal in the polling reception allowing the efficient use of the memory.

When the call is made by the auto-dial having the service access number or the service access password registered therein and if the destination station does not have the function to receive the SUB/SEP/PWD signal, the user may select through the soft switch whether to interrupt or continue the communication.

It should be understood that the present invention is not limited to the above embodiment but various modifications thereof may be made.

What is claimed is:

1. A facsimile apparatus comprising:

a plurality of manipulation means for auto-calling;

memory means for storing call information on a call of a destination station, corresponding to each of said plurality of manipulation means, said memory means including a first memory area for storing first information for a sub-address signal or a selective polling signal defined in ITU-T Recommendation T.30 and a second memory area for storing second information for a password signal defined in ITU-T Recommendation T.30;

register means for registering the first information or the second information corresponding to each of said plurality of manipulation means in said memory means;

call means, responsive to manipulation of said manipulation means, for calling in accordance with the call information in said memory means corresponding to the manipulated manipulation means; generating means for generating data of the sub-address signal or the selective polling signal in accordance with the first information corresponding to the manipulated manipulation means, or generating data of the password signal in accordance with the second information corresponding to the manipulated manipulation means; and sending means for sending, to a destination station, the sub-address signal, the selective polling signal, or the password signal in accordance with the generated data.

2. A facsimile apparatus according to claim 1, wherein the first information indicates a service access number and the second information indicates a service access password.

3. A facsimile apparatus according to claim 2, wherein in a case where the first information corresponding to the manipulated manipulation means has been registered in said first memory area, said generating means generates frame data of the sub-address signal or the selective polling signal and said sending means sends the sub-address signal or the selective polling signal including the generated frame data.

4. A facsimile apparatus according to claim 2, wherein in a case where the second information corresponding to the manipulated manipulation means has been registered in said second memory area, said generating means generates frame data of the password signal and said sending means sends the password including the generated frame data.

5. A facsimile apparatus according to claim 2, wherein in a case where the first or second information corresponding to the manipulated memory means has been registered in said first memory area or said second memory area and the destination station lacks a function to receive the sub-address signal, the selective polling signal or the password signal, said sending means does not send the sub-address signal, the selective polling signal or the password signal.

6. A facsimile apparatus according to claim 2, further comprising mode setting means for setting a sub-address signal, selective polling signal or password signal transmission disable operation mode, wherein in a case where the first or second information corresponding to the manipulated memory means has been registered in said first memory area or said second memory area and the destination station lacks a function to receive the sub-address signal, the selective polling signal or the password signal, said sending means selects, by said mode setting means, a mode for interrupting communication or a mode for not sending the sub-address signal, the selective polling signal or the password signal.

7. A facsimile method comprising the steps of:

providing a plurality of manipulation means for auto-calling;

storing, in memory means, call information on a call of a destination station, corresponding to each of the plurality of manipulation means, the memory means including a first memory area for storing first information for a sub-address signal or a selective polling signal defined in ITU-T Recommendation T.30 and a second memory area for storing second information for a password signal defined in ITU-T Recommendation T.30;

registering the first information or the second information corresponding to each of the plurality of manipulation means in the memory means;

calling, responsive to manipulation of the manipulation means, in accordance with the call information in the memory means corresponding to the manipulated manipulation means;

generating data of the sub-address signal or the selective polling signal in accordance with the first information corresponding to the manipulated manipulation means, or generating data of the password signal in accordance with the second information corresponding to the manipulated manipulation means; and sending, to a destination station, the sub-address signal, the selective polling signal, or the password signal in accordance with the generated data.

8. A facsimile method according to claim 7, wherein the first information indicates a service access number and the second information indicates a service access password.

9. A facsimile method according to claim 8, wherein in a case where the first information corresponding to the manipulated manipulation means has been registered in the first memory area, said generating step generates frame data of the sub-address signal or the selective polling signal and said sending step sends the sub-address signal or the selective polling signal including the generated frame data.

10. A facsimile method according to claim 8, wherein in a case where the second information corresponding to the manipulated manipulation means has been registered in the second memory area, said generating step generates frame data of the password signal and said sending step sends the password including the generated frame data.

11. A facsimile method according to claim 8, wherein in a case where the first or second information corresponding to the manipulated memory means has been registered in the first memory area or the second memory area and the destination station lacks a function to receive the sub-address signal, the selective polling signal or the password signal, said sending step does not send the sub-address signal, the selective polling signal or the password signal.

12. A facsimile method according to claim 8, further comprising a mode setting step for setting a sub-address signal, selective polling signal or password signal transmission disable operation mode, wherein in a case where the first or second information corresponding to the manipulated memory means has been registered in the first memory area or the second memory area and the destination station lacks a function to receive the sub-address signal, the selective polling signal or the password signal, said sending step selects, by said mode setting step, a mode for interrupting communication or a mode for not sending the sub-address signal, the selective polling signal or the password signal.

* * * * *

UNITED STATES PATENT AND TRADEMARK OFFICE
CERTIFICATE OF CORRECTION

PATENT NO. : 5,692,036
DATED : November 25, 1997
INVENTOR(S) : TOSHIAKI SAITO

It is certified that error appears in the above-identified patent and that said Letters Patent is hereby corrected as shown below:

<u>IN THE TITLE ON THE COVER PAGE</u>

"AUTO" SHOULD READ -- AUTO- --.

<u>COLUMN 1</u>

Line 1, "AUTO" SHOULD READ -- AUTO- --

<u>COLUMN 5</u>

Line 7, "generating" should read --¶ generating--.

Signed and Sealed this

Twelfth Day of May, 1998

Attest:

BRUCE LEHMAN

Attesting Officer

Commissioner of Patents and Trademarks